Oct. 10, 1933.  J. J. MOJONNIER  1,930,318

DISTRIBUTING CONVEYER

Filed April 4, 1932  2 Sheets-Sheet 1

INVENTOR.
Julius J. Mojonnier
BY Thomas H. Ferguson
ATTORNEY.

Oct. 10, 1933.        J. J. MOJONNIER        1,930,318
DISTRIBUTING CONVEYER
Filed April 4, 1932        2 Sheets-Sheet 2
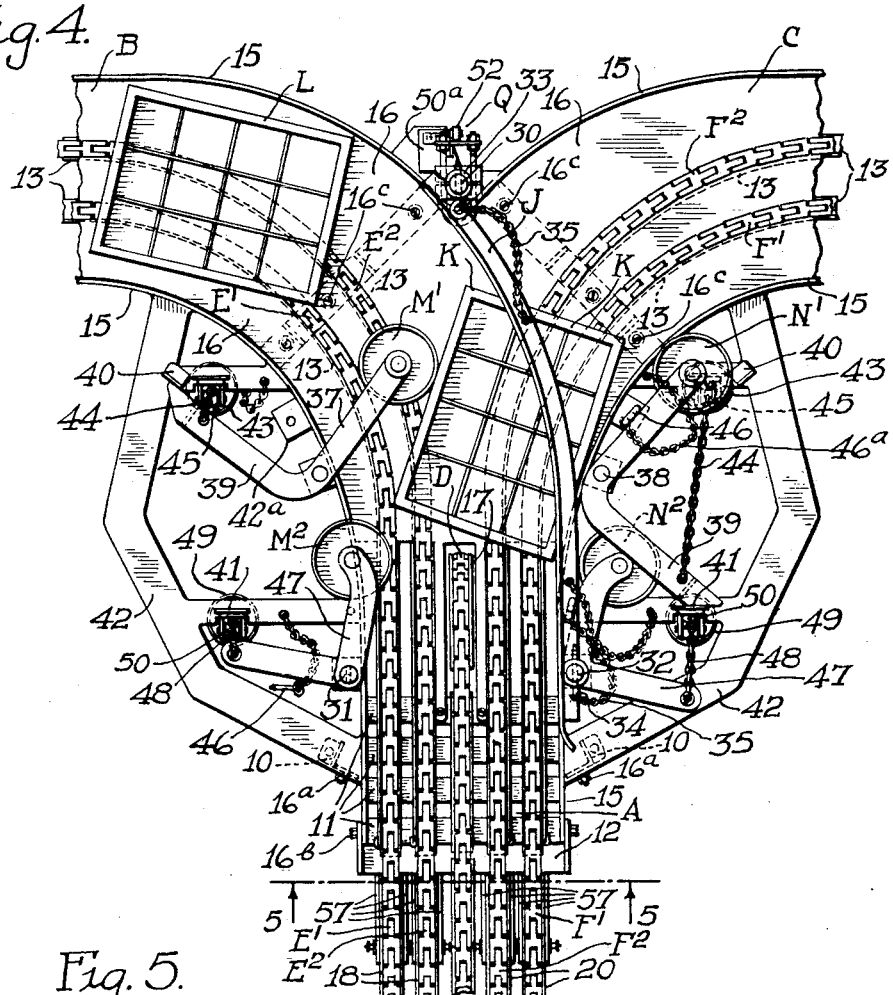
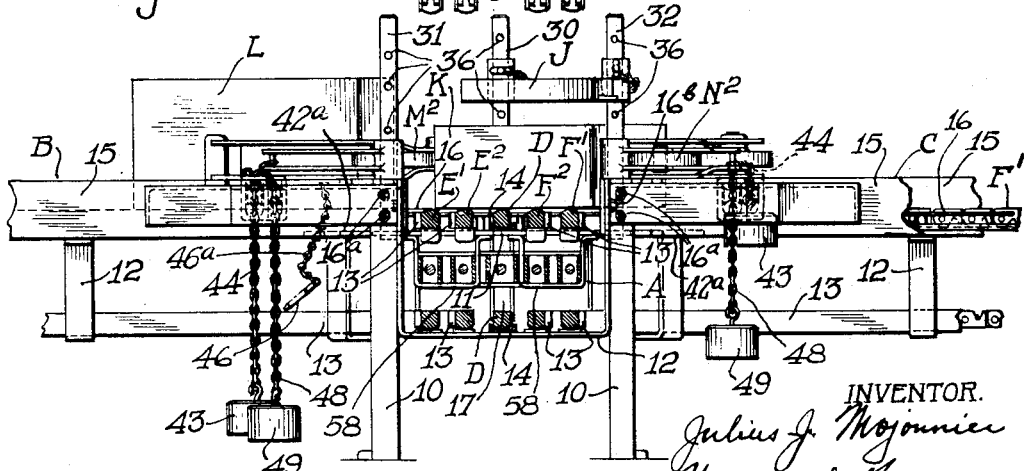
INVENTOR.
Julius J. Mojonnier
BY Thomas H. Ferguson
ATTORNEY.

Patented Oct. 10, 1933

1,930,318

UNITED STATES PATENT OFFICE 1,930,318

DISTRIBUTING CONVEYER

Julius J. Mojonnier, Oak Park, Ill., assignor to Mojonnier Bros. Co., a corporation of Illinois Application April 4, 1932. Serial No. 603,089

11 Claims. (Cl. 209—90)

The present invention relates in general to distributing conveyers and has to do more particularly with distributing conveyers that select and separate articles according to size.

The invention is the result of activity in the milk handling field and consequently the specific embodiment selected for illustration and description is taken from that field. In dairies and like places the bottles in which the milk is marketed are commonly of quart and pint sizes and are moved about in what might be termed quart and pint size cases. The quart size case is higher than the pint size case and it is this difference in height which is taken advantage of to bring about the sorting of the cases. Although the invention is disclosed in a specific embodiment suited to the handling of milk and like bottled commodities, yet it is obvious that the invention is capable of use in other fields of endeavor and should not be unduly limited in this respect.

One object of the invention is to provide a novel arrangement of channels and chains wherein articles traveling along a main channel will be sorted and guided into lateral channels which form outlet continuations of the main channel and wherein the chain employed shall be capable of vertical and lateral flexure after the manner of the chain of my prior Patent No. 1,804,701, dated May 12, 1931.

Another object is to provide a structure of the kind mentioned in which a reversal of the selecting functions may be had by a simple shifting of a guide bar from one side of the main conveyer channel to the other.

Another object is to provide novel pressure members which shall effectively handle the cases or other articles being conveyed. To this end a plurality of members are employed on each side of the main channel and the members on each side are given different degrees of movement according to their positions relative to the discharge opening through which the articles pass.

These and other objects, features and advantages of the invention will be more fully understood upon reference to the following detailed description taken in connection with the accompanying drawings and the scope of the invention will be particularly pointed out in the appended claims.

Figure 1:
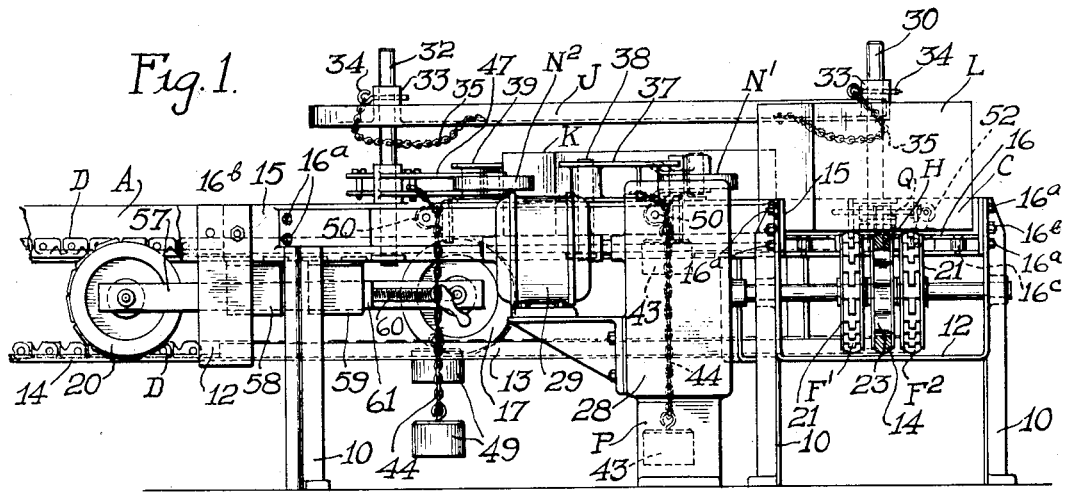
Figure 2:
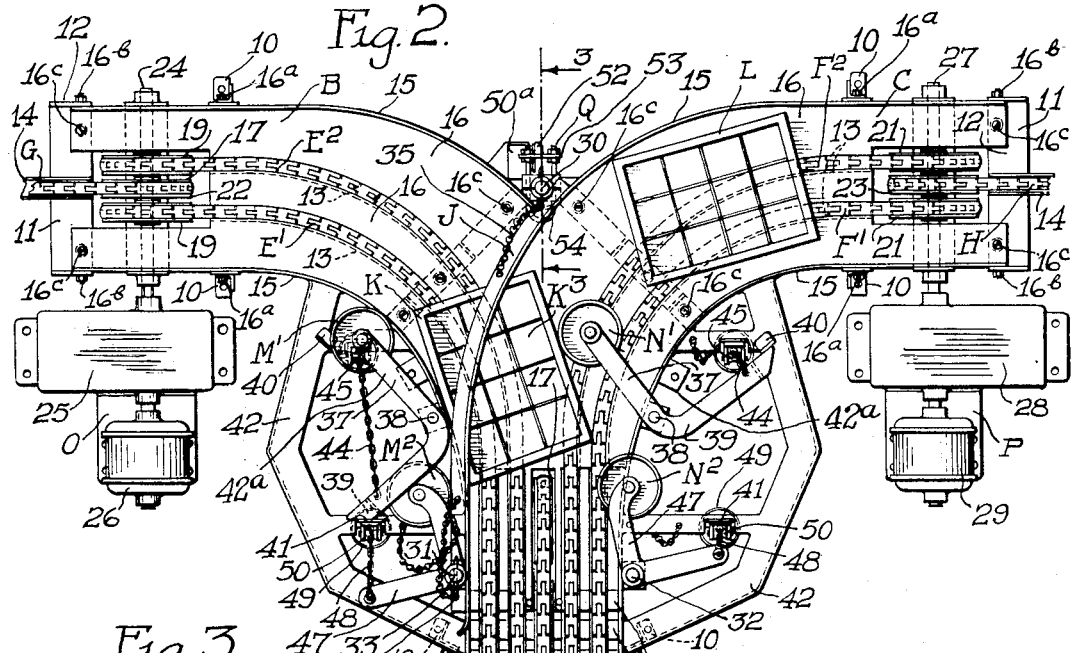
Figure 3:
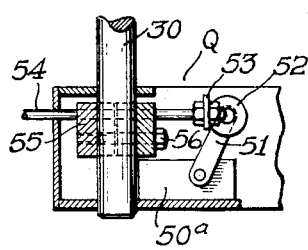

In said drawings, Fig. 1 is a side elevation of a selecting conveyer constructed and arranged in accordance with the present invention; Fig. 2 is a plan view of the same showing the low, or pint, cases passing to the lateral channel at the left and the high, or quart, cases passing to the lateral channel at the right; Fig. 3 is a detail view of limit switch actuating mechanism adapted to stop the conveyer chains in case of a jam of cases on the conveyer, parts being shown in section taken on a plane indicated by the line 3—3 of Fig. 2; Fig. 4 is a plan view of a portion of the conveyer, upon a somewhat larger scale, showing the low cases passing to the lateral channel at the right and the high cases passing to the lateral channel at the left; and Fig. 5 is an end elevation of the structure of Fig. 4 with parts shown in section, the plane of section being indicated by the line 5—5 of Fig. 4. Throughout these views like characters refer to like parts.

The illustrated conveyer comprises essentially a main conveyer channel A; two oppositely extending lateral channels B, C, which form outlet continuations of the main channel; a main conveyer chain D; left hand conveyer chains $E^1$, $E^2$ for conveying articles around the curved end of the channel B; right hand conveyer chains $F^1$, $F^2$ for conveying articles around the curved end of the channel C; a right line conveyer chain G for channel B; a right line conveyer chain H for channel C; a guide bar J which allows low cases K to pass below it but diverts the high cases L; pressure members $M^1$, $M^2$, which, in operation, force the cases toward channel C; pressure members $N^1$, $N^2$, which, in operation, force the same toward channel B; power units O, P, for driving the laterally curved conveyer chains $E^1$, $E^2$ and $F^1$, $F^2$, respectively; and a limit switch Q which may be mechanically operated by a lodged case to open the circuits of the electric motors of the units O, P, to stop the conveyer chains until the lodged case can be dislodged.

The channels A, B, C have the general construction of the conveyer channels of my aforesaid prior Patent No. 1,804,701 and my prior Patent No. 1,755,450, dated April 22, 1930. They are formed of metal supporting and frame members and guideways along which the different chains travel. In brief, there are the posts 10, the upper transverse bars 11, the hangers 12, the track members or guideways upon which the chain travels which usually take the form of angle bars 13 where the chain travels around a horizontal curve and channel bars 14 where there is a straight section. Then, there are the side walls 15 to hold the articles within the lateral confines of the channels, and in the curved portions of the latter, flat plates constituting the floors 16, suitably notched and otherwise cut away to accommodate the chain, the chain sprockets and other parts. These frame parts, being of metal, are suitably secured together, usually by welding, although in some instances it is preferable to use bolts and screws. Thus, bolts $16^a$ connect the side walls 15 and other parts to the posts 10. Other bolts $16^b$ connect the ends of the walls to the hangers 12 at points where the ends of independent sections of the conveyer are brought and secured together. Again, where the floor plates 16 are secured to the cross members 11 it is preferable to use screws $16^c$.

The chain D is a chain which need only be capable of vertical flexure as it travels in a straight line along the center of channel A except where it passes around its sprocket wheels such as the sprocket wheel 17. This chain may therefore be like that disclosed in my aforesaid prior Patent No. 1,755,450. As before noted, the chain of my aforesaid Patent No. 1,804,701 is capable of lateral flexure as well as the vertical flexure required when passing over the sprocket wheels. The lateral flexure, however, will not be objectionable to the use of the chain for straight portions of the conveyer. Consequently the chain D may be made, if desired, according to said Patent No. 1,804,701. As clearly shown, the sprocket wheel 17 is located near the end of the main channel A and the beginning of the curved portions of the lateral channels B, C.

The chains $E^1$, $E^2$ and $F^1$, $F^2$ require freedom of lateral movement in addition to the vertical flexure and are therefore chains having loosely jointed links, preferably chains of the kind illustrated in my said Patent No. 1,804,701. The chains $E^1$, $E^2$ pass over sprocket wheels 18 located at one side of the center chain D in the channel A. At their opposite ends they pass over similar sprocket wheels 19 located on opposite sides of the center chain G of the channel B. Similarly the chains $F^1$, $F^2$ pass over sprocket wheels 20 located in the main channel A on the opposite side of the central chain D from the sprocket wheels 18. They also pass over sprocket wheels 21 located on opposite sides of the chain H of the channel C. As clearly shown, the chains $E^1$, $E^2$, $F^1$, $F^2$ pass around curves in going from the main channel to the lateral channels and are guided by the upright flanges of the angle bars 13. It will also be noted that the chains $E^1$, $E^2$, diverge as they pass from the main channel A into the lateral channel B and that in like manner the chains $F^1$, $F^2$ diverge as they pass from the main channel A into the lateral channel C.

The chain G which is centrally positioned along the straight portion of the lateral channel B passes over a sprocket wheel 22. In like manner the chain H which is similarly positioned in the lateral channel C passes over a sprocket wheel 23.

The sprocket wheels 19, 22 are mounted upon a common driving shaft 24 associated with the reduction gear 25 of the power unit O. This unit also includes an electric motor which operates through the reduction gear to drive the shaft 24 and through the latter to drive the sprocket wheels 19 and 22, and the chains $E^1$, $E^2$ and G.

Similarly the sprocket wheels 21, 23 are mounted upon a driving shaft 27 which through a suitable reduction gear 28 is driven from an electric motor 29. Thus the gear wheels 21 and 23 become driving wheels for the chains $F^1$, $F^2$ and H. The reduction gear 28 and the motor 29 constitute the driving unit P.

From the description thus far given, it will be seen that I have provided a construction capable of conveying articles from a main conveyer A onto and along either of two lateral conveyers B, C. Indeed, if no additional means be provided for controlling the articles being conveyed, it would still be possible to guide them by hand from the main channel A to either of the branch channels B or C. However, instead of a manual control in connection with the low cases K and the high cases L, it is preferable to use a guide bar such as the curved guide bar J.

The guide bar J, when in service, is always secured at what may be called its forward end, to a central supporting post 30. At its rear end it is similarly connected to one or the other of two lateral supporting posts 31, 32, the connection with post 31 being shown in Fig. 2 and that with post 32 in Fig. 4. Each of the posts 30, 31, 32 is preferably cylindrical and extends far enough above the surfaces of the conveying chains so as to allow for the free passage of the low cases K beneath the bar J whenever the latter is properly positioned upon the posts. The bar J is provided with apertured hubs or bosses 33 and these are provided in each case with a transverse opening for the passage of a retaining pin 34, preferably secured to the bar by chain 35. The posts 30, 31, 32 are in turn provided with a series of transverse apertures 36 which are capable of alignment with the openings in the bosses 33 so that the pins 34 may pass not only through the bosses but also through the posts. The openings 36 are arranged in a vertical series so that the guide bar J may be set at different heights according to the particular objects to be passed beneath it and diverted by it. As these parts are shown in the drawings, the bar J is high enough to pass the low cases K but will be engaged by the high cases L.

With the bar J set in the position shown in Fig. 2, the low cases K may be passed beneath the bar into the lateral channel B and ultimately carried to the left by the chain G. The high cases L, however, cannot be passed beneath the bar J and must travel into the channel C and ultimately be carried forward by the chain H. On the other hand, if the bar J be reversed so as to lie in the position illustrated in Fig. 4, then it would be possible to pass the low cases K to the right under the bar into the channel C and the high cases L would be compelled by contact with the bar J to pass to the left into the channel B.

From what has been described thus far it will be seen that with the bar J in position for the passage of the cases in either of the ways mentioned, it would be possible to normally control the flow of cases so that the low ones would pass beneath the bar and the high ones would be diverted by it. But it is preferable to provide additional means for applying directed pressure to the cases automatically.

For the purpose of applying guiding pressure to the cases, pressure members in the form of anti-friction wheels $M^1$, $M^2$ on the one side and $N^1$, $N^2$ on the other side, are employed. When the bar J is set at the left, as shown in Fig. 2, then the pressure members $M^1$, $M^2$ are held back so as to be inoperative while the members $N^1$, $N^2$ are left free to act upon the cases as they advance. When the bar J is oppositely disposed, as shown in Fig. 4, then the members $N^1$, $N^2$ are held back so as to be inoperative and the members $M^1$, $M^2$ are allowed to apply pressure to the cases to cause them to pass into their proper channels.

The pressure wheel M¹ is journaled between the upper and lower members of a framed arm 37 which is pivoted at 38 to a fixed portion of the conveyer frame. Arm 37 is in the form of a bell crank and has an end 39 which may be moved between stops 40 and 41 located upon a lateral frame 42 properly secured to the main frame of the conveyer. When the wheel M¹ is in inoperative position, as illustrated in Fig. 2, its end 39 engages the stop 41. When it is in operative or active position, as illustrated in Fig. 4, then the same end 39 engages the stop 40. A weight 43 is associated with the pressure member M¹. A chain 44 is connected at one end to the arm 39 of the member 37 and passes over a pulley 45 and is connected at its other end to the weight 43. The action of the weight is to yieldingly force the pressure member M¹ toward the center of the channel. Whenever the member M¹ is in an inoperative position, then the weight 43 is drawn upward. Any suitable means may be provided for holding the parts in this inoperative position. Thus, a retaining pin 46, held to an adjacent portion of the frame 42 by a flexible chain or cord 46ª, may be passed through a hole in a lug 42ª on the frame 42. By inserting the pin 46 after the arm 37 has been moved to its outer position, the pin will bear against the side of the arm and hold the latter against inward movement, as clearly shown at the right in Fig. 4 and at the left in Fig. 2. The pressure member N¹ which is positionally opposed to the pressure member M¹ is provided with a similar bell crank arm 37, pivot 38, extension 39, stops 40, 41, lateral frame 42, weight 43, chain 44, pulley 45 and openings for a retaining pin 46.

It will be noted that the pressure members M¹, N¹ have a considerable transverse throw, passing from a position just outside of the channel into a position near its center. It will also be noted that these members when in active position are substantially opposite the center of the opening beneath the bar J. This range of motion is in decided contrast to that of the associated pressure members M², N². The latter have a very limited lateral movement and it will be noted also that they are located near the beginning of the discharge opening. Their action is to give the initial movements to the cases as they reached the critical point of either passing through the discharge opening beneath the bar J or being diverted by it. The mounting of the pressure members M², N² is in each case similar to the members M¹, N¹ and includes a bell crank lever arm 47 pivoted concentrically with the post 31 in the case of member M² and with the post 32 in the case of member N². Each bell crank lever 47 has its free end connected by a chain 48 with an associated weight 49 which acts as before over a pulley 50 to yieldingly press the associated pressure member toward the center of the channel whenever the parts are free to act and not held in inoperative position. As clearly shown, whenever the wheels M¹, M² are in retracted or inoperative position, the wheel M² enters into the space between the upper and lower frame members of the framed arm 37. The same is the case with the wheels N¹, N² whenever they are retracted. Then the wheel N² lies nested between the members of the arm 37 on that side of the structure.

Near the post 30 is an apex between the curved ends of the lateral channels B and C, and it may occur in rare instances that the cases being conveyed will be jammed. To prevent prolonging this objectionable condition or aggravating it, I provide at the said apex the aforesaid limit switch Q and rely upon its being actuated by the thrust of a jammed case. The switch itself is located within the casing 50ª and may be of any well known construction and need not be particularly described. Suffice it to say that the same is normally closed but is thrown into open position by the actuation of the lever 51 to the right as the parts are shown in Fig. 3. As there shown, an anti-friction roller or wheel 52 is pressed toward the left against the bar 53 which is secured at its ends to the arms of a yoke 54. The latter embraces the post 30 and travels along and is movable in openings or channels formed in the opposite sides of the split guide block 55 firmly secured to the post by machine screws 56. In normal position the yoke 54 extends toward the channel A and the limit switch 50ª is closed, thereby supplying current to the motors 26 and 29 of the power units O, P. The circuits which include the switch and the motors are not shown as the same may take various forms and will be well understood by persons skilled in this art. As soon as a case K or L jams against the yoke 54 the latter will be moved toward the right as the parts are viewed in Fig. 3, and the switch arm 51 thrown to the right to open the limit switch and thus cut off the application of further power to the electric motors. After the jam is removed, the switch may be reset by shifting the lever to the left again, as the parts are viewed in Fig. 3.

Obviously, with the straight conveyer chains D, G and H it will be possible to take up slack by any suitable means such as illustrated, for example, in my aforesaid Patent No. 1,755,450. When it comes to taking up slack in the curved conveyer chains E¹, E², F¹, F² this can be readily done by mounting the sprocket wheels 18 and 20 in separate yokes 57 and mounting the latter for longitudinal reciprocation within guides 58, 59 secured to the frame work of the conveyer. By means of an adjusting screw 60 acting through a nut 61 fixed within the guide 59 it is possible to press upon the associated yoke 57 in each case and thus tighten up on the associated chain.

It will be understood that in carrying out my invention in different embodiments many alterations and modifications of what is disclosed herewith may be made without departing from the spirit and scope of the invention. I therefore aim to cover by the terms of the appended claims all those alterations and modifications which rightly come within the spirit and scope of the invention.

What I claim as new and desire to secure by Letters Patent of the United States is:

1. A conveyer of the class described comprising a main channel, oppositely curved lateral channels forming outlet continuations of said main channels, said channels having floor members and side members for receiving and guiding articles being conveyed, a main conveyer chain extending centrally and longitudinally of said main channel, a cooperating sprocket wheel for said main chain located near the end of said main channel and the beginning of said curved channels, two pairs of loosely jointed conveyer chains extending longitudinally along said main channel and then oppositely around first the curved and then the outer rectilinear portions of said lateral channels, the chains of each said pair diverging as they pass from said main channel to said lateral channels, other cooperating sprocket wheels for the outer ends of said two pairs of chains, said wheels in each case being spaced apart, a third sprocket wheel between the wheels of each of said pairs, a single conveyer chain for engaging with each of said third sprocket wheels, and power means for driving certain of said sprocket wheels to drive said two pairs of conveyer chains.

2. A conveyer of the class described, comprising a main channel oppositely curved lateral channels forming outlet continuations of said main channel, said channels having floor and side members for receiving and guiding articles of different heights being conveyed, a main conveyer chain extending centrally and longitudinally of said main channel, a cooperating sprocket wheel for said main chain located near the outlet end of said main channel and the inlet curved ends of said lateral channels, two pairs of laterally flexible conveyer chains having upper article engaging surfaces, said chains extending lengthwise of said main channel and then over inner curved and outer rectilinear portions of said lateral channels, the chains of each said pair diverging as they pass from said main channel out over said lateral channels, other sprocket wheels for the outer ends of said two pairs of chains, said wheels in each case being spaced apart, a third sprocket wheel between the wheels of each of said pairs, a laterally extending conveyer chain for passing over each of said third sprocket wheels, power means for driving certain of said sprocket wheels to drive said two pairs of conveyer chains, a central supporting post at a point near the intersection of the central longitudinal lines of said main and lateral channels, lateral supporting posts on opposite sides of said main channel near said first mentioned sprocket wheel, and a curved guide bar secured to said central post and one of said lateral posts to guide high articles into one of said lateral channels while allowing low articles to pass beneath it into the other of said lateral channels, said bar being fitted for connection to said central post and to the other of said lateral posts to provide for an opposite selection and guidance of said high and low articles.

3. A conveyer of the class described, comprising a main channel, oppositely curved lateral channels forming outlet continuations of said main channel, said channels having floor and side members for receiving and guiding articles of different heights being conveyed, a main conveyer chain extending centrally and longitudinally of said main channel, a cooperating sprocket wheel for said main chain located near the outlet end of said main channel and the inlet curved ends of said lateral channels, two pairs of laterally flexible conveyer chains having upper article engaging surfaces, said chains extending lengthwise of said main channel and then over inner curved and outer rectilinear portions of said lateral channels, the chains of each said pair diverging as they pass from said main channel out over said lateral channels, other sprocket wheels for the outer ends of said two pairs of chains, said wheels in each case being spaced apart, a third sprocket wheel between the wheels of each of said pairs, a laterally extending conveyer chain for passing over each of said third sprocket wheels, power means for driving certain of said sprocket wheels to drive said two pairs of conveyer chains, a central supporting post at a point near the intersection of the central longitudinal lines of said main and lateral channels, lateral supporting posts on opposite sides of said main channel near said first mentioned sprocket wheel, a curved guide bar secured to said central post and one of said lateral posts to guide high articles into one of said lateral channels while allowing low articles to pass beneath it into the other of said lateral channels, said bar being fitted for connection to said central post and to the other of said lateral posts to provide for an opposite selection and guidance of said high and low articles, yieldingly pressing means on opposite sides of said main channel near said first mentioned sprocket wheel tending to force articles being conveyed to the opposite side of the channel, and means for locking the pressing means on either side of the channel against operation while leaving that on the other side free for action, whereby said pressing means may be operated to force low articles beneath said guide bar into one lateral channel and yield to allow high articles engaged by said bar to pass into the other lateral channel.

4. A conveyer of the class described, comprising a main channel oppositely curved lateral channels forming outlet continuations of said main channel, said channels having floor and side members for receiving and guiding articles of different heights being conveyed, a main conveyer chain extending centrally and longitudinally of said main channel, a cooperating sprocket wheel for said main chain located near the outlet end of said main channel and the inlet curved ends of said lateral channels, two pairs of laterally flexible conveyer chains having upper article engaging surfaces, said chains extending lengthwise of said main channel and then over inner curved and outer rectilinear portions of said lateral channels, the chains of each said pair diverging as they pass from said main channel out over said lateral channels, other sprocket wheels for the outer ends of said two pairs of chains, said wheels in each case being spaced apart, a third sprocket wheel between the wheels of each of said pairs, a laterally extending conveyer chain for passing over each of said third sprocket wheels, power means for driving certain of said sprocket wheels to drive said two pairs of conveyer chains, a central supporting post at a point near the intersection of the central longitudinal lines of said main and lateral channels, lateral supporting posts on opposite sides of said main channel near said first mentioned sprocket wheel, a curved guide bar secured to said central post and one of said lateral posts to guide high articles into one of said lateral channels while allowing low articles to pass beneath it into the other of said lateral channels, said bar being fitted for connection to said central post and to the other of said lateral posts to provide for an opposite selection and guidance of said high and low articles, a pair of pressure members on each side of said main channel, one of each pair being near said first mentioned sprocket wheel and the other of each pair being outward beyond said main channel to press articles against the walls of the curved portions of said lateral channels, and means for preventing the operation of the pair of pressure members on the same side as said guide bar and allowing the pair on the opposite side to function, whereby the pressure member nearest said main channel presses an article against the far side of that channel to start it under said bar if it is a low article and the second pressure member of the operating pair engages the article at a later point and insures its advance under said bar into the opposite lateral channel in case it is a low article, both pressure members serving to keep the article in contact with the guide bar in case the article is a high one, the travel of the article in the latter event being into the lateral channel on the side of the channel upon which the active pressure members are located.

5. A conveyer of the class described, comprising a main channel, a curved lateral channel forming a continuation of said main channel, said channels having floor members and side members for receiving and guiding articles being conveyed, a main conveyer chain extending longitudinally of said main channel, a cooperating sprocket wheel for said main chain located near the end of said main channel and the beginning of said curved channel, a pair of laterally flexible conveyer chains extending for a short distance lengthwise of said main channel and then outward along the curved portion of said lateral channel, the chains of said pair diverging as they pass from said main channel to said lateral channel, other cooperating sprocket wheels for the outer ends of said pair of chains, said latter wheels being spaced apart, a third sprocket wheel between the wheels of said pair, a single conveyer chain for engaging with said third sprocket wheel, and power means for driving certain of said sprocket wheels to drive said pair of conveyer chains.

6. A conveyer of the class described, comprising a main channel, a curved lateral channel forming a continuation of said main channel, said channels having floor members and side members for receiving and guiding articles being conveyed, a main conveyer chain extending longitudinally of said main channel, a cooperating sprocket wheel for said main chain located near the end of said main channel and the beginning of said curved channel, a pair of laterally flexible conveyer chains extending for a short distance lengthwise of said main channel and then outward along the curved portion of said lateral channel, the chains of said pair diverging as they pass from said main channel to said lateral channel, other cooperating sprocket wheels for the outer ends of said pair of chains, said latter wheels being spaced apart, a third sprocket wheel between the wheels of said pair, a single conveyer chain for engaging with said third sprocket wheel, power means for driving certain of said sprocket wheels to drive said pair of conveyer chains, and a curved guide member forming an outer wall of said curved channel, said guide member having a discharge opening beneath it through which articles not high enough to engage it may be pressed.

7. A conveyer of the class described, comprising a main channel, a curved lateral channel forming a continuation of said main channel, said channels having floor members and side members for receiving and guiding articles being conveyed, a main conveyer chain extending longitudinally of said main channel, a cooperating sprocket wheel for said main chain located near the end of said main channel and the beginning of said curved channel, a pair of laterally flexible conveyer chains extending for a short distance lengthwise of said main channel and then outward along the curved portion of said lateral channel, the chains of said pair diverging as they pass from said main channel to said lateral channel, other cooperating sprocket wheels for the outer ends of said pair of chains, said latter wheels being spaced apart, a third sprocket wheel between the wheels of said pair, a single conveyer chain for engaging with said third sprocket wheel, power means for driving certain of said sprocket wheels to drive said pair of conveyer chains, a curved guide member forming an outer wall of said curved channel, said guide member having a discharge opening beneath it through which articles not high enough to engage it may be pressed, and yielding pressure means on the inner side of said curved channel movable laterally of said channel toward and from said guide member and operative to press through said discharge opening articles not high enough to engage said bar and to yield to articles engaged thereby to allow the latter to pass through said lateral channel.

8. A conveyer of the class described, comprising a main channel, a curved lateral channel forming a continuation of said main channel, said channels having floor members and side members for receiving and guiding articles being conveyed, a main conveyer chain extending longitudinally of said main channel, a cooperating sprocket wheel for said main chain located near the end of said main channel and the beginning of said curved channel, a pair of laterally flexible conveyer chains extending for a short distance lengthwise of said main channel and then outward along the curved portion of said lateral channel, the chains of said pair diverging as they pass from said main channel to said lateral channel, other cooperating sprocket wheels for the outer ends of said pair of chains, said latter wheels being spaced apart, a third sprocket wheel between the wheels of said pair, a single conveyer chain for engaging with said third sprocket wheel, power means for driving certain of said sprocket wheels to drive said pair of conveyer chains, a curved guide member forming an outer wall of said curved channel, said guide member having a discharge opening beneath it through which articles not high enough to engage it may be pressed, a pair of yielding pressure members on the inner side of said curved channel movable transversely of said channel and operative to press through said discharge opening articles not high enough to engage said bar and to yield to articles engaged thereby to allow the latter to pass along said lateral channel, one of said pressure members being near the end of said first mentioned conveyer chain and the other of said pressure members being more directly opposite said discharge opening.

9. In a selecting conveyer, a channel having floor and side members and a discharge opening in one side, a conveyer chain of the drag type in said channel, a pair of crowding wheels for pressing against articles being conveyed along said channel to pass certain of them through said discharge opening, and mounting means for said wheels, the mounting for the wheel which first engages the articles allowing said wheel a short lateral throw at a point opposite the forward edge of said discharge opening and the mounting for the other wheel allowing said wheel a greater lateral throw at a point opposite the center of said discharge opening.

10. In a selecting conveyer, a channel having floor and side members and a discharge opening in one side, a conveyer chain of the drag type in said channel, a pair of crowding wheels for pressing against articles being conveyed along said channel to pass certain of them through said discharge opening, a supporting lever for the first encountered of said wheels having a short throw and positioning said wheel opposite the forward edge of the discharge opening, a supporting lever for the second of said wheels to be encountered by advancing articles, said lever having a relatively long throw and positioning the second wheel more nearly opposite the center of said discharge opening, and means for yieldingly pressing said arms and wheels into article engaging positions.

11. In a selecting conveyer, a channel having floor and side members and a discharge opening in one side, a conveyer chain of the drag type in said channel, a pair of crowding wheels for pressing against articles being conveyed along said channel to pass certain of them through said discharge opening, a supporting lever for the first encountered of said wheels having a short throw and positioning said wheel opposite the forward edge of the discharge opening, a supporting lever for the second of said wheels to be encountered by advancing articles, said lever having a relatively long throw and positioning the second wheel more nearly opposite the center of said discharge opening, and a weight and connections for each lever for giving the same a yielding pressure toward the center of said channel.

JULIUS J. MOJONNIER.